Aug. 12, 1969                 F. F. OHNTRUP                 3,460,699
MOVABLE UPRIGHT ASSEMBLY WITH A LATERALLY AND
PIVOTALLY MOUNTED CARRIER
Filed Oct. 27, 1967                                                     2 Sheets-Sheet 1
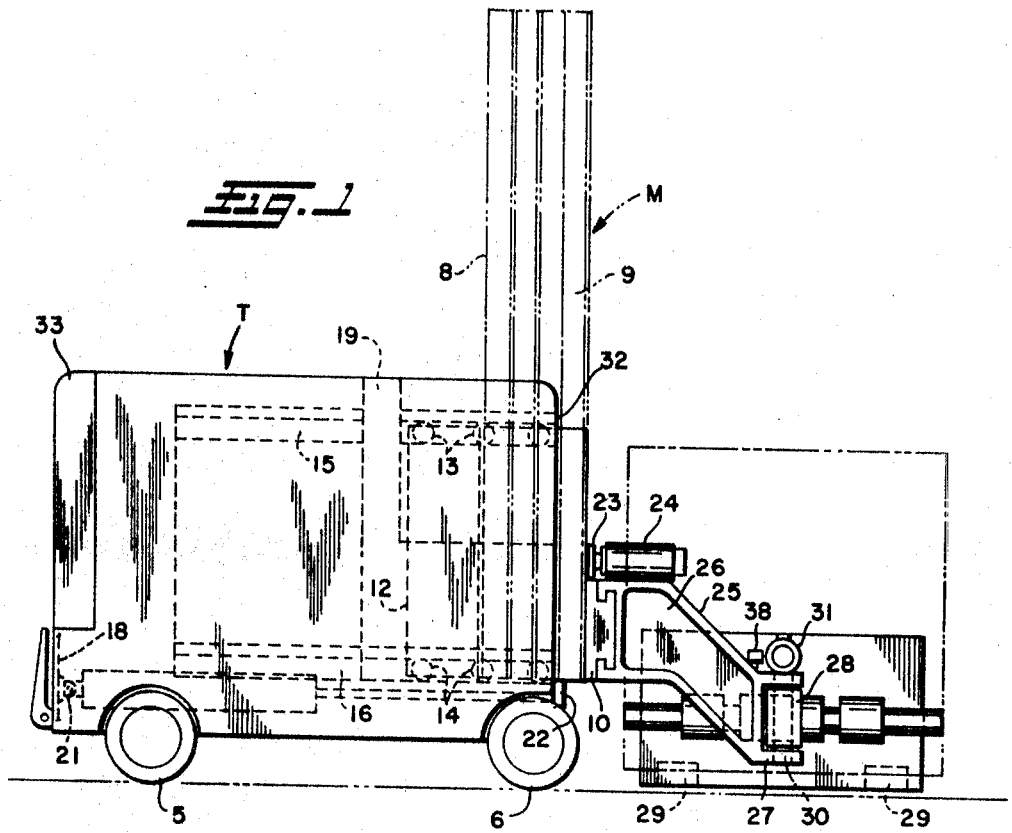
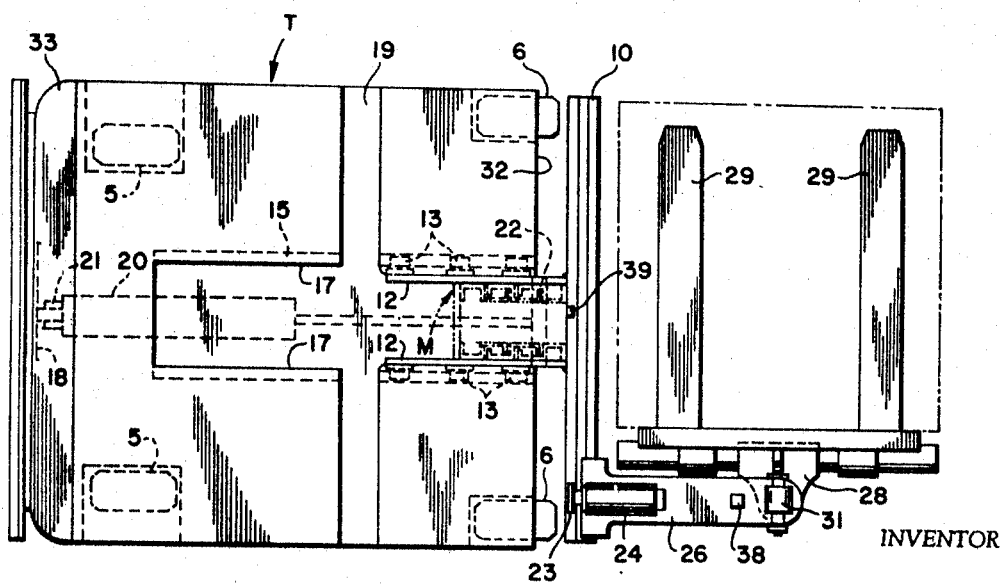
INVENTOR
FREDERICK F. OHNTRUP
BY
ATTORNEYS

United States Patent Office 3,460,699
Patented Aug. 12, 1969

3,460,699
MOVABLE UPRIGHT ASSEMBLY WITH A LATERALLY AND PIVOTALLY MOUNTED CARRIER
Frederick F. Ohntrup, Plymouth Meeting, Pa., assignor to Eaton Yale & Towne Inc., Cleveland, Ohio, a corporation of Ohio
Filed Oct. 27, 1967, Ser. No. 678,621
Int. Cl. B66f 9/12
U.S. Cl. 214—660               12 Claims

ABSTRACT OF THE DISCLOSURE

An industrial truck having a longitudinally movable mast with a load member so connected to the mast that the load may be maneuvered at the side as well as the front of the truck with the load in juxtaposed relation to the front of the truck. Thus, the overhang or moment exerted by the load is a minimum.

---

This invention relates to an industrial truck. More particularly, it relates to that type of industrial truck in which a load carriage moves vertically on a mast, and carries thereon a load lifting member that is adapted to rotate. By rotation of the load lifting member, a load may be accepted when at one side or the other of the truck, or when the load is forward of the truck. Similarly, the load may be deposited at one side or the other of the truck or forwardly of the truck.

Industrial trucks of this type are well known in the art and numerous patents have issued covering various features thereof. However, as far as I know, no truck of the particular class has been commercially acceptable because when the load is positioned forwardly of the truck, it is so far forward that it tends to render the truck unstable unless extremely heavy counterweights are utilized, or unless the truck is lengthened unduly to compensate for the overhang of the load.

I have conceived a construction in which the mast may be so manipulated that the rear of the load is in juxtaposed relation to the main frame of the truck when the load faces forwardly. Thus, if the load is carried by a set of conventional load forks, the rear portions of the load forks will lie in closely related position to the forward end of the truck when the forks face forwardly of the truck in parallel relation to the longitudinal axis of the truck. Therefore, the overhang or moment exerted by the load will be minimum. Similarly, when the load faces sidewise, with the forks lying at right angles to the longitudinal axis of the truck, one side of the load will lie juxtaposed to the forward end of the truck to reduce the tipping moment exerted by the load.

As a feature of my invention, I utilize a mast that is adapted for movement longitudinally of the truck and preferably in its longitudinal axis. A carriage is mounted for vertical movement on the mast, as is customary in the art, but is so formed relatively to the main frame of the truck and the forward wheels of the truck, that it may be retracted rearwardly of the truck as the mast is moved rearwardly from a forward position.

Mounted for sliding movement on the carriage is a load carrying arm. A particular feature of the arm is its formation so that its end portion may support a rotating load member which may take the form of conventional load forks. Through rotation, the forks may be positioned to face to one side or the other of the truck in any side shifted position of the load arm relatively to the carriage. The load member may also be placed in any intermediate position, as for example, facing forwardly in parallel relation to the longitudinal axis of the truck.

As a further particular feature, the load arm is formed so that while it supports the load member for rotation relatively thereto, the forks or other load accepting carrying part of the load member may be juxtaposed relatively to the floor on which the truck moves so as to accept or deposit a load.

As a further particular feature of the invention, the relationship of the load arm and the main frame and carriage is such that preferably when the load arm is in substantial alignment with the longitudinal axis of the truck, it may be retracted together with the mast so as to place the rear of the load member in juxtaposed relation to the main frame of the truck and the forward wheels of the truck. Therefore, when the load member is in the form of lift forks, these lift forks may move to place their rear portions in juxtaposed relation to the main frame of the truck when the forks are parallel to the longitudinal axis of the truck. This means, naturally, that the rear of the load will now be positioned as closely to the truck as is possible to minimize the tipping moment exerted by the truck.

Those skilled in the art will further appreciate that through rotation of the forks consituting the load member, the load may be positioned to face one side or the other of the truck while in close juxtaposed relation to the end of the truck and can similarly be positioned to face forwardly of the truck with the rear portion of the load in juxtaposed relation to the forward end of the truck. In other words, I am able to contribute a truck having a very substantial degree of stability in each of the several positions the load may assume.

As a still further feature of the invention, I utilize a pair of uprights or pairs of uprights that are positioned closely relatively to one another. This makes possible the use of an industrial truck having a relatively narrow longitudinal opening for the movement of the uprights longitudinally of the truck. Because this opening is relatively narrow, the manufacture of the frame of the truck with the required rigidity and strength to handle a heavy load, is simplified. The particular mechanism that I utilize for handling the forks and their rotation, makes possible the use of the closely positioned uprights together with the advantages resulting from that positioning.

Even more particularly, my invention contemplates the use of a carriage that is substantially the same in width as the width of the truck. The lower surface of the carriage is so related to at least a portion of the upper surface of the main frame of the truck that it travels with the uprights just above the surface of the main frame, as the uprights move inwardly of the truck. Obviously, the lower surface of the carriage will, therefore, be a relatively considerable distance above the floor on which the truck moves. The arm that moves transversely of the truck on the carriage, preferably as part of a load carrier, extends downwardly relatively to the carriage and will lie in the narrow opening in which the uprights move longitudinally of the truck when those uprights are moved inwardly of the truck so that the load may be held lowered. This means, therefore, that the arm must be particularly aligned laterally of the truck and the carriage as a prerequisite to the movement of the uprights inwardly of the main frame.

In other words, the preferred form of my inventive concept includes a truck having a relatively narrow upright assembly movable in a narrow longitudinal opening of the truck main frame. Mounted on the assembly is a relatively wide carriage whose lower surface is spaced upwardly from the floor on which the truck moves, the carriage having mounted for transverse movement thereon an arm that extends downwardly into the opening in which the uprights move so as to require particular alignment of the arm to the opening before the uprights may be retracted. It is this retraction that will position the rear of the load in juxtaposed relation to the main frame when the load member faces forwardly, as outlined earlier.

I have thus outlined rather broadly the more important features of my invention in order that the detailed description thereof that follows may be better understood and in order that my contribution to the art may be better appreciated. There are additional features of my invention that will be described hereinafter and which will form the subject of the claims appended hereto. Those skilled in the art will appreciate that the concept on which my disclosure is based may readily be utilized as the basis of designing for other structures for carrying out the several purposes of my invention.

It is important, therefore, that the claims be of sufficient breadth to prevent the appropriation of my invention by those skilled in the art.

Referring now to the drawings:

FIG. 1 is a side elevational view of the preferred form of my conventional lift truck showing the forks rotated so that they may be protracted laterally of the truck for picking up a load at the side of an aisle.

FIG. 2 is a plan view of my truck with the forks positioned as in FIG. 1.

Figure 3:
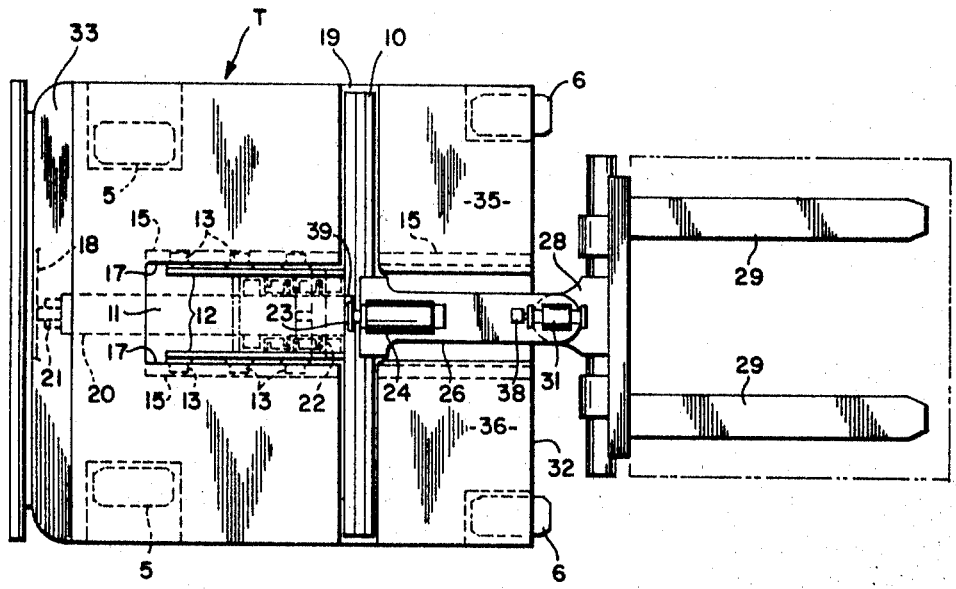
FIG. 3 is a plan view of my truck showing the forks rotated into a position parallel to the longitudinal center line of the truck with the mast retracted so that loads may be handled in a conventional manner.

In the preferred form of the invention shown in the drawings, I utilize a truck T for supporting a mast M with the truck having the usual wheels 5 and 6 and a retracted operator stand 7. The truck, of course, may be provided with the usual operator controls for steering, powering, braking and operating the mast and other sideshifter and rotator but since these controls are conventional and are known in the art, they are not illustrated in order to simplify the disclosure.

The mast M is narrow and provided with a fixed upright 8 and one or more movable uprights 9 preferably of a construction as shown in the Ulinski patent application Ser. No. 573,531, filed Aug. 19, 1966. A load carriage 10 is mounted for vertical movement relative to the forwardmost movable upright.

The mast M is movable longitudinally of the truck in a narrow longitudinal opening or well 11 formed in the body of the truck. The fixed upright 8 is secured to a pair of vertical parallel plates 12 each of which carries a plurality of upper rollers 13 and lower rollers 14 which ride respectively within horizontal upper tracks 15 and lower tracks 16 in the sidewalls 17 defining the well 11. The lower tracks 16 extend continuously from the forwardmost end of the truck to the inner end 18 but the upper tracks 15 are interrupted to provide an opening 19 for receiving the carriage 10.

The mast and the plates 12 are movable from the position shown in FIGS. 1 and 2 to the retracted position shown in FIG. 3 by means of a ram 20 secured at 21 to the inner end 18 of the truck and to a cross member 22 interconnecting the plates 12.

The carriage 10 extends for substantially the complete width of the truck body. A sideshifter 23, suitably electrically or hydraulically powered by a motor 24, is mounted on the upper end of an arm 26 which is slidably mounted on the carriage 10 by a T groove interfitting within a T flange on the carriage. By energizing the motor 24, the arm 26 may be moved to any position between the ends of the carriage 10. The arm 26 extends horizontally from the carriage 10 for a limited distance and a portion 25 projects downwardly and terminates in a yoke 27. Load carrier 28, which may include forks 29 or other load engaging means, is provided with a pin 30 supported within the yoke member 27 for pivotal movement relative to the arm 26 from a forwardly extending position as shown in FIG. 3 to a laterally extending position to either side of the arm 26 as shown in FIGS. 1 and 2. The pivotal movement of the load carrier 28 is powered by suitable hydraulic or electric motor 31 which controls the angular position of the load carrier 28 relative to the arm 26 in any position between 90° to either side of the longitudinal center line of the truck.

As previously indicated with the mast in fully retracted position as shown in FIG. 3 and with the sideshifter 23 positioned to locate the arm 26 centrally of the truck body and with the load carrier pivoted so that the forks 29 extend parallel to the longitudinal center line of the truck, a load may be picked up, elevated and deposited in a manner similar to conventional truck operations. With the mast retracted and with the forks 29 parallel to the center line of the truck, very little overhang exists between the load carrier and the axis of the front wheels. Thus, the rear of the load is in juxtaposition relative to the front 32 of the truck so that the counterweight 33 is relatively small and the stability of the truck is excellent.

Figure 4:
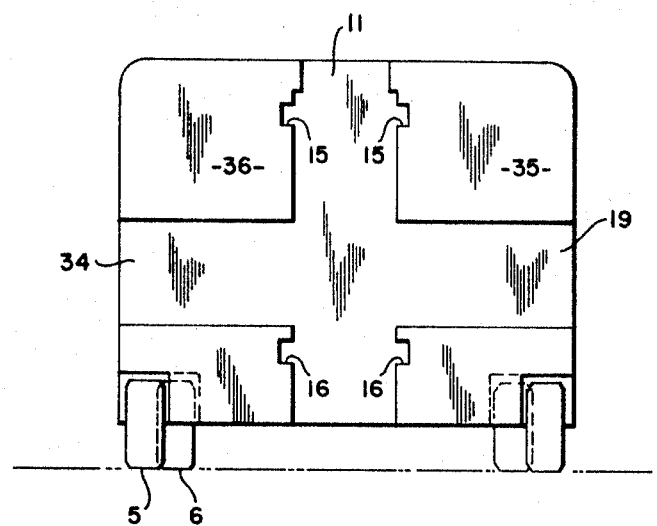
FIG. 4 is a front partial elevational view of my truck.

In order to allow for retraction of the mast M into the well 11, the front 32 of the truck is cut away at 34 so that the carriage 10 and sideshifter 23 may move freely through the opening 34. The portions 35 and 36 of the truck body, defined by the openings 19, 34 and well 11, may be utilized for power and control equipment, but if desired such portions may be omitted as indicated in FIG. 4.

A limit switch 38 is mounted on the forward end of the arm 26 which is closed when the load carrier 28 is rotated to position the forks 29 in forwardly extending position. Also, a limit switch 39 is mounted at the center of the carriage 10 and is closed when the sideshifter has moved the arm 26 to the center of the carriage 10 in which position the arm is aligned with the well 11 and the center line of the truck. The switches 38 and 39 are so connected electrically with the control circuit for operating ram 20 that the mast M cannot be retracted into the well 11 unless both switches 38 and 39 are closed. Thus, the mast cannot be retracted except when both the arm 26 and the forks 29 are aligned with the center line of the truck and well 11.

If it is desired to pick up a load existing at the side of an aisle in a warehouse, for example, the operator actuates the sideshifter 23 to move the arm 26 to an extreme side position shown in FIG. 2 and also actuates the motor 31 to rotate the load carrier 28 and forks 29 into the position shown in FIG. 2. The operator then proceeds down the aisle to the location of the load, actuates the mast M to elevate the forks to the desired height of the load and then again actuates the sideshifter 23 to project the forks into engagement with the load. The above steps are then reversed and the operator proceeds to the location desired for depositing the load. With the mast in its extreme forward position and the forks rotated to a lateral position, a side edge of the load is in juxtaposition with the forward end of the truck and the center of gravity of the load is approximately the same as that shown in FIG. 3 of the drawings. In other words, with the forks 29 pivoted into a position facing forwardly of the truck and the mast fully retracted, the load overhangs the truck approximately the same amount as when the mast is protracted and the forks pivoted to face the side of the truck and in both positions a side of the load is in juxtaposition with the forward end of the truck.

I claim:

1. In an industrial truck, a main frame, an upright assembly movably mounted on said main frame for movement forwardly and rearwardly of said main frame in a line parallel to the longitudinal axis of said truck, a carriage mounted for vertical movement on said upright assembly, a load supporting arm extending from said load carrier in a line substantially parallel to the longitudinal axis of said truck, means for side shifting said arm relative to said carriage to one side or the other of said main frame on said carriage, a load member mounted on said arm for rotation relatively thereto around a substantially vertical axis between positions substantially 180° apart whereby to position said load member in any position between a forwardly facing position and laterally facing position, and means for moving said upright assembly between forward and rearward positions on its mounting relatively to said main frame so that when the arm is held by said upright assembly extended from said main frame, the load member may be rotated relatively to said arm to position the load member and a load thereon facing toward one side or the other of the main frame with a side of the load juxtaposed relatively to said main frame, and means for preventing retraction of the upright assembly unless the load member is facing forwardly of said arm whereby the upright assembly may be retracted relatively to said main frame to position the rear of the load in juxtaposed relation to said main frame.

2. In the combination of claim 1, the feature that said upright assembly is relatively narrow, and said main frame has a narrow longitudinally centered opening in which said uprights move longitudinally of said truck.

3. In the combination of claim 2, the feature that said carriage is substantially wider than said uprights, whereby said load carrier has substantial side shifting movement, said carriage having its lower surface so positioned relatively to a portion of the truck main frame so as to be movable with said uprights inwardly over at least a portion of said main frame.

4. In the combination of claim 3, the feature that said carriage is substantially the entire width of the truck.

5. In the combination of claim 3, the feature that said load supporting arm moving with the load carrier has a part extending downwardly from the carrier so as to be retractable with the carrier and carriage inwardly of said main frame only when aligned with the said narrow longitudinally centered opening of said main frame when said carriage is lowered on said uprights whereby to require particular lateral alignment of said load carrier on said carriage as a prerequisite to retraction of said uprights.

6. In the combination of claim 4, the feature that said load supporting arm moving with the load carrier has a part extending downwardly from the carrier so as to be retractable with the carrier and carriage inwardly of said main frame only when aligned with the said narrow longitudinally centered opening of said main frame when said carriage is lowered on said uprights whereby to require particular lateral alignment of said load carrier on said carriage as a prerequisite to retraction of said uprights.

7. In the combination of claim 2, the feature that said carriage, in its lowered position, is movable with said mast so as to bring it together with said arm within the peripheral border of said main frame.

8. In the combination of claim 1, the feature that said load member is mounted on said load arm in a position to present its load carrying surface substantially at ground level.

9. In the combination of claim 7, the feature that said load member is mounted on said load arm in a position to present its load carrying surface substantially at ground level.

10. In the combination of claim 1, the feature that said load member is a lifting fork assembly.

11. In the combination of claim 7, the feature that said load member is a lifting fork assembly.

12. In the combination of claim 1, the feature that said upright assembly comprises juxtaposed uprights occupying a relatively narrow portion of the transverse dimension of the truck, said frame having a narrow longitudinally positioned opening extending inwardly from the forward end of the main frame in which said uprights move longitudinally bodily of said truck, a carriage substantially the width of said truck mounted for vertical movement on said uprights, the lower surface of said carriage being so determined relatively to the main frame that said carriage may move with said uprights over at least a portion of said main frame, and said load arm on said load carrier extending downwardly from said carriage whereby to move in said longitudinally positioned opening when said upright assembly and carriage move inwardly of said main frame, so as to require particular lateral alignment of said load carrier on said carriage as a prerequisite to retraction of said uprights with said arm in said opening.

References Cited

UNITED STATES PATENTS 3,106,305 10/1963 Gehring _____ 214—730
3,143,081 7/1964 Dolphin et al. _____ 214—730 X

FOREIGN PATENTS 990,992 5/1965 Great Britain.
1,060,789 7/1959 Germany.

GERALD M. FORLENZA, Primary Examiner
RAYMOND B. JOHNSON, Assistant Examiner

U.S. Cl. X.R.
214—730